(12) United States Patent
Ziemer et al.

(10) Patent No.: US 12,449,027 B2
(45) Date of Patent: Oct. 21, 2025

(54) TRANSMISSION FOR E-AXLE (71) Applicant: ZF Friedrichshafen AG, Friedrichshafen (DE)

(72) Inventors: Peter Ziemer, Bad Woerishofen (DE); Bernard Hunold, Friedrichshafen (DE); Eckhardt Lübke, Friedrichshafen (DE); Thomas Riedisser, Sigmarszell (DE); Thomas Schneider, Langenargen (DE); Martin Brehmer, Tettnang (DE); Thomas Martin, Weissensberg (DE); Michael Wechs, Weißensberg (DE); Fabian Kutter, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 133 days.

(21) Appl. No.: 18/192,930

(22) Filed: Mar. 30, 2023

(65) Prior Publication Data

US 2023/0313871 A1 Oct. 5, 2023

(30) Foreign Application Priority Data

Mar. 31, 2022 (DE) ...................... 10 2022 203 203.9

(51) Int. Cl.
*B60K 1/02* (2006.01)
*B60K 1/00* (2006.01)
(Continued)

(52) U.S. Cl.
CPC ............. *F16H 37/082* (2013.01); *B60K 1/00* (2013.01); *B60K 6/365* (2013.01); *B60K 6/442* (2013.01);
(Continued)

(58) Field of Classification Search
CPC ......... F16H 2200/201; F16H 3/62–666; F16H 2200/2038; F16H 2061/0422;
(Continued)

(56) References Cited

U.S. PATENT DOCUMENTS

| 4,229,996 | A | * | 10/1980 | Hildebrand | ............... F16H 3/66 475/903 |
| 2007/0032327 | A1 | * | 2/2007 | Raghavan | .............. B60K 6/445 475/284 |

(Continued)

FOREIGN PATENT DOCUMENTS

| DE | 102012220517 A1 | 5/2014 |
| DE | 102016213709 A1 | 2/2018 |
| DE | 102019217155 A1 | 5/2021 |

OTHER PUBLICATIONS

German Office Action DE 10 2022 203 203.9 dated Nov. 17, 2022 (14 pages).

*Primary Examiner* — Ernesto A Suarez
*Assistant Examiner* — Lillian T Nguyen
(74) *Attorney, Agent, or Firm* — Dority & Manning, P.A.

(57) ABSTRACT

An electric transmission (16) for a motor vehicle drive train (12) includes a transmission input shaft (24) for operatively connecting the electric transmission to an electric prime mover (14), a reduction gear (26) for reducing a rotational speed of the electric prime mover, a transmission (28) for establishing gear steps, including a first planetary gear set (RS1) and a second planetary gear set (RS2), a first output shaft (34) and a second output shaft (36) for transmitting drive power from the electric transmission, and a plurality of shift elements (B, C, D) for engaging the gear steps. A planet carrier of the first planetary gear set is drivingly connected to a planet carrier of the second planetary gear set, and a sun
(Continued)

gear of the first planetary gear set is drivingly connected to a ring gear of the second planetary gear set.

15 Claims, 4 Drawing Sheets

(51) Int. Cl.
    *B60K 6/365*     (2007.10)
    *B60K 6/442*     (2007.10)
    *B60K 6/52*     (2007.10)
    *B60K 6/547*     (2007.10)
    *F16H 3/62*     (2006.01)
    *F16H 37/08*     (2006.01)
    *F16H 61/04*     (2006.01)

(52) U.S. Cl.
    CPC ............... *B60K 6/52* (2013.01); *B60K 6/547* (2013.01); *F16H 61/0403* (2013.01); *B60K 2001/001* (2013.01); *B60Y 2200/92* (2013.01); *F16H 2061/0422* (2013.01); *F16H 2200/0021* (2013.01); *F16H 2200/0039* (2013.01); *F16H 2200/2007* (2013.01); *F16H 2200/2038* (2013.01)

(58) Field of Classification Search
    CPC .......... B60K 1/00–02; B60K 2001/001; B60K 17/16–165
    See application file for complete search history.

(56) References Cited

U.S. PATENT DOCUMENTS

| | | | |
|---|---|---|---|
| 2015/0167788 A1* | 6/2015 | Beck | F16H 3/66 475/269 |
| 2017/0072781 A1* | 3/2017 | Huh | F16H 3/089 |
| 2018/0266525 A1* | 9/2018 | Beck | F16H 3/666 |
| 2019/0100092 A1* | 4/2019 | Schilder | B60K 6/387 |
| 2021/0094403 A1* | 4/2021 | Lee | B60K 1/02 |
| 2021/0394602 A1* | 12/2021 | Schilder | F16H 3/66 |
| 2023/0039003 A1* | 2/2023 | Beck | F16H 3/666 |

\* cited by examiner

|  | B | C | D |
|---|---|---|---|
| 1G |  | X | X |
| 2G | X |  | X |
| 3G | X | X |  |

Fig. 10

TRANSMISSION FOR E-AXLE

CROSS-REFERENCE TO RELATED APPLICATIONS

The present application is related and claims priority to 102022203203.9 filed in the German Patent Office on Mar. 31, 2022, which is incorporated by reference in its entirety for all purposes.

FIELD OF THE INVENTION

The present invention relates generally to an electric transmission, a motor vehicle drive train, a method for operating a motor vehicle drive train, and a motor vehicle.

BACKGROUND

Vehicles are increasingly equipped with hybrid drives, i.e., with at least two different drive sources. Hybrid drives can contribute to the reduction of fuel consumption and pollutant emissions. Drive trains that include an internal combustion engine and one or multiple electric motor(s) have largely prevailed as a parallel hybrid or as a mixed hybrid. These types of hybrid drives have an essentially parallel arrangement of the internal combustion engine and the electric drive in the power flow. Here, a superposition of the drive torques as well as a control with a purely internal combustion engine-generated drive or a purely electric motor-generated drive can be made possible. Since the drive torques of the electric drive and of the internal combustion engine can add up depending on the control, a comparatively smaller design of the internal combustion engine and/or the intermittent shut-down of the internal combustion engine are/is possible. As a result, a significant reduction of the carbon dioxide ($CO_2$) emissions can be achieved without significant losses of power and/or comfort. The possibilities and advantages of an electric drive can therefore be combined with the range, power, and cost advantages of internal combustion engines.

One disadvantage of the aforementioned hybrid drives is a generally more complex configuration, since both drive sources preferably transmit input power onto an input shaft with only one transmission. As a result, the production of such transmissions is usually complex and costly. A reduction of the complexity of the configuration of a hybrid transmission is usually associated with a loss of variability.

This disadvantage can be at least partially overcome by dedicated hybrid transmissions (DHT), in which an electric machine is integrated into the transmission in order to implement the full range of functions. For example, in the transmission, in particular, the mechanical transmission part can be simplified, for example, by omitting the reverse gear, at least one electric machine being used instead.

Dedicated hybrid transmissions can arise from known transmission concepts, i.e., from dual-clutch transmissions, torque converter planetary gears, continuously variable transmissions (CVT), or automated manual transmissions. The electric machine becomes part of the transmission.

An electric axle or e-axle is another possibility for efficiently expanding a drive train into a hybrid drive train. Here, a non-main drive axle is driven by an electric prime mover and preferably by utilizing a transmission. It is understood that the electric axle can be combined with a pure combustion drive or a hybrid drive.

Unexamined patent application DE 10 2019 217 155 A1 relates to an electric drive for a vehicle that includes at least one electric machine, which drives a drive shaft, which is coupled, via a first planetary gear and a second planetary gear for realizing at least one first gear step and one second gear step, to an output differential for driving at least two output shafts. The drive shaft and the output shafts are coaxially arranged. The drive shaft is coupled to a sun gear of the first planetary gear and to a sun gear of the second planetary gear, wherein a planet carrier of the first planetary gear and of the second planetary gear is coupled via a third planetary gear to the output differential. A ring gear of the first planetary gear is connectable to a housing via a first shift element for engaging the first gear step. A ring gear of the second planetary gear is connectable to the housing via a second shift element for engaging the second gear step.

SUMMARY OF THE INVENTION

Example aspects of the present invention provide a cost-efficient electric transmission for an electric drive that has at least two gear steps. Preferably, an overall gear ratio of the electric transmission is to be greater than (>) 2, wherein a ratio step between two adjacent gear steps is to be less than (<) 2. In particular, an electric transmission for an electric axle that includes a high-speed electric prime mover is to be created.

According to example aspects, an electric transmission for a motor vehicle drive train of a motor vehicle includes:
- a transmission input shaft for operatively connecting the electric transmission to an electric prime mover of the motor vehicle;
- a reduction gear for reducing a rotational speed of the electric prime mover;
- a transmission for establishing gear steps, including a first planetary gear set and a second planetary gear set;
- a first output shaft and a second output shaft for transmitting drive power from the electric transmission; and
- multiple gear change devices including shift elements for engaging the gear steps; wherein
- a planet carrier of the first planetary gear set is drivingly connected to a planet carrier of the second planetary gear set, and
- a sun gear of the first planetary gear set is drivingly connected to a ring gear of the second planetary gear set.

Moreover, according to example aspects, a motor vehicle drive train for a motor vehicle includes:
- an electric transmission as defined above; and
- an electric prime mover, which is drivingly connected to the transmission input shaft.

Example aspects of the present invention also include a method for operating a motor vehicle drive train as defined above.

According to example aspects, a motor vehicle includes a motor vehicle drive train as defined above and an energy accumulator for storing energy for supplying the electric prime mover.

It is understood that the features, which are mentioned above and which will be described in greater detail in the following, are usable not only in the particular combination indicated, but rather also in other combinations or alone, without departing from the scope of the present invention. In particular, the motor vehicle drive train, the motor vehicle, and the method can be designed according to the example embodiments of the electric transmission.

Drive power of the electric prime mover can be technically easily introduced into the electric transmission by a transmission input shaft for operatively connecting the electric transmission to an electric prime mover. An operative connection can be designed to be engageable or permanently engaged. A high-speed electric prime mover can be used with the electric transmission due to a reduction gear for reducing a rotational speed of the electric prime mover. As a result, in particular, a cost-effective and weight-optimized electric prime mover can be used. It is understood that the reduction gear can be arranged upstream or downstream from the transmission for establishing gear steps in the electric transmission. A compact electric transmission can be created by a first planetary gear set and a second planetary gear set. Drive power from the electric transmission can be technically easily transmitted to two wheels of an axle of the motor vehicle by a first output shaft and a second output shaft for transmitting drive power from the electric transmission. It is understood that the electric transmission can also include a differential, in particular a differential gear unit. Due to the fact that a planet carrier of the first planetary gear set is drivingly connected to a planet carrier of the second planetary gear set and a sun gear of the first planetary gear set is drivingly connected to a ring gear of the second planetary gear set, a highly compact electric transmission can be created, with which at least two, in particular three, gear steps are technically easily establishable. An axially compact and a radially compact electric transmission can be created, in particular for an electric axle. In particular, two reduction gears and one direct gear having a very high efficiency can be created with the electric transmission. Preferably, the stationary transmission ratios of the planetary gear sets are each in the structurally favorable range with a value less than ($<$) 2.2.

In one advantageous example embodiment, the shift elements include two brakes and one clutch, wherein an uncoupled sun gear, in particular the sun gear of the second planetary gear set, is connectable to the drive shaft by a clutch and is rotationally fixable by a first brake, wherein an uncoupled ring gear, in particular the ring gear of the first planetary gear set, is rotationally fixable by a second brake. Alternatively, the shift elements include a brake and two clutches, wherein a free shaft is connectable by a first clutch to an uncoupled ring gear, in particular to the ring gear of the first planetary gear set, the free shaft is connectable by a second clutch to an uncoupled sun gear, in particular to the sun gear of the second planetary gear set, and the free shaft is rotationally fixable by the brake. A free shaft permits, in particular, the engagement of all gear steps available in the electric transmission by a single actuator. In addition, alternatively, the shift elements include two brakes, wherein an uncoupled ring gear, in particular the ring gear of the first planetary gear set, is rotationally fixable by a first brake, and an uncoupled sun gear, in particular the sun gear of the second planetary gear set, is rotationally fixable by a second brake. Depending on the desired ratio of the gear steps, a two-speed electric transmission can be technically easily created in this way. Moreover, the aforementioned embodiment permits the engagement of each gear step by engaging a single shift element.

In another advantageous example embodiment, two reduction gears and one direct gear are establishable with the electric transmission. A direct gear enables a highly efficient electric transmission. Due to the use of reduction gears, a cost-efficient, lightweight, and high-speed electric prime mover can be used. An electric transmission can be created for a space-saving and weight-optimized drive train.

In another advantageous example embodiment, the first planetary gear set and the second planetary gear set are radially nested. In addition, a planet carrier of the first planetary gear set and a planet carrier of the second planetary gear set are designed as one piece. As a result, an electric transmission can be created that is cost-efficient and can be quickly produced. A nested gear set is understood to mean, in particular, that the planetary gear sets are arranged inside each other. In other words, a sun gear of the first planetary gear set can form a ring gear of the second planetary gear set. Consequently, the planetary gear sets are arranged in one gear set plane. As a result, an extremely compact and efficient electric transmission can be created.

In another advantageous example embodiment, the clutches are designed as form-locking shift elements, in particular as constant-mesh shift elements. As a result, a low-loss and cost-efficient electric transmission can be created.

In another advantageous example embodiment, the electric transmission includes precisely three shift elements. As a result, an easily actuated, compact, three-speed electric transmission having a range of functions can be created. In particular, it is preferably conceivable to actuate the three shift elements using one single actuator.

In another advantageous example embodiment, the electric transmission includes, at the output end of the electric transmission, a differential, in particular a ball or spur gear differential. In addition, the electric transmission includes an axially parallel or coaxial reduction gear in the form of a two-carrier five-shaft transmission that includes an integrated differential. As a result, an electric transmission can be created, which can be technically easily drivingly connected to a motor vehicle axle. A reduction gear that includes an integrated differential enables an electric transmission that is as compact as possible. In particular, the combination of a reduction gear with a differential creates an electric transmission that has few meshing points, i.e., a highly efficient electric transmission.

In another advantageous example embodiment, the electric transmission includes a differential lock. As a result, the range of functions of the electric transmission can be technically easily expanded. In particular, as a result, the electric transmission can be used for an all-wheel drive vehicle, which has one further drive and an electric axle including an above-described electric transmission.

In another advantageous example embodiment, the electric transmission has an overall gear ratio of great than ($>$) 2. An overall gear ratio is to be understood, in particular, to be the relationship of the ratio of the lowest gear step with respect to the ratio of the highest gear step. An overall gear ratio of greater than ($>$) 2 enables a large area of application for the electric transmission. In particular, a further operating range can be covered using a comparatively small electric prime mover.

In another advantageous example embodiment, a ratio step between two adjacent gear steps is less than ($<$) 2. As a result, a close-ratio gradation of the individual gear steps can be achieved. Preferably, the electric prime mover can be operated in a favorable range in nearly all driving situations.

In another advantageous example embodiment, the electric prime mover is actuatable as a synchronizer during a gear shift in the electric transmission. As a result, an efficient gear shift can be carried out. In addition, a synchronizer enables the use of form-locking shift elements. In particular, cost-effective shift elements can be used, which are smaller-dimensioned, since a prior synchronization can reduce a load on the shift elements during shifting.

In another advantageous example embodiment, the electric transmission is drivingly connectable to a first motor vehicle axle, wherein a second motor vehicle axle is connectable to a further hybrid drive and the electric prime mover is suppliable with power by a further hybrid drive, which is operated as a generator, in order to establish a serial driving mode. Additionally or alternatively, the electric prime mover is actuatable as a supporting force means, in order to maintain a supporting force during gear shifts in the further hybrid drive. As a result, an efficient motor vehicle drive train can be created. In particular, the fuel consumption can be reduced. A serial driving mode enables electric driving and starting off also when an energy accumulator is empty. A supporting force can be technically easily provided during gear shifts in the further hybrid drive by an electric prime mover that is actuatable as a supporting force means. The ride comfort can be increased technically easily and without modifications at the further hybrid drive.

A rotational fixation of an element of a planetary gear set is to be understood, in particular, as blocking a rotation of the element about the axis of rotation of the element. Preferably, the element is rotationally fixed to a static component, such as a frame and/or a transmission housing, by a shift element. It is also conceivable to decelerate the element to a standstill.

An interlock of a planetary gear set includes drivingly connecting two gearwheels and/or the planet carrier and one gearwheel of the planetary gear set such that these rotate together at the same speed about the same point, preferably the center of the planetary gear set. Upon interlocking two gearwheels and/or one planet carrier and one gearwheel of the planetary gear set, the planetary gear set preferably operates as a shaft. In particular, no multiplication takes place in the planetary gear set.

The expression "drivingly connected" is intended to mean, in this context, in particular, a permanent connection between two components, the permanent connection being provided for a permanent transmission of a rotational speed, a torque, and/or drive power. The connection can be implemented directly and also via a fixed ratio. The connection can be implemented, for example, via a fixed shaft, a toothing, in particular a spur gear tooth system, and/or a wrap-around means, in particular a flexible traction drive mechanism.

The expression "drivingly connectable," "can be drivingly connected," or "is designed for drivingly connecting" is intended to mean, in this context, in particular, a disengageable connection between two components, the disengageable connection being provided for a temporary transmission of a rotational speed, a torque, and/or a drive power in an engaged condition. In a disengaged condition, the disengageable connection preferably temporarily transmits essentially no rotational speed, no torque, and/or no drive power. The disengageable connection may be provided by selectively engaging a shift elements, such as a clutch or brake.

Stationary charging or charging-in-neutral is understood, in particular, to be the operation of the electric prime mover as a generator, preferably while the vehicle is at rest with the internal combustion engine running, in order to charge an energy accumulator and/or to supply onboard electronics.

An actuator in the present case is, in particular, a component that converts an electrical signal into a mechanical motion. Preferably, actuators that are used with double shift elements carry out movements in two opposite directions. In the first direction, the actuators actuate one shift element of the double shift element and, in the second direction, actuate the other shift element.

A gear step change takes place, in particular, by disengaging one shift element and/or a clutch and simultaneously engaging the shift element and/or the clutch for the next higher or lower gear step. The second shift element and/or the second clutch therefore gradually take(s) on the torque from the first shift element and/or from the first clutch until the entire torque has been taken on by the second shift element and/or the second clutch by the end of the gear step change. Prior synchronization enables a gear ratio change to be carried out faster. Preferably, form-locking shift elements can be used in this case.

During a serial driving operation or creeping, an electric prime mover of a motor vehicle is operated as a generator by an internal combustion engine of the motor vehicle. The energy generated in this way is then provided to a further electric prime mover of the motor vehicle in order to provide drive power.

An electric vehicle axle, or electric axle, is preferably a non-main drive axle of a motor vehicle, in the case of which drive power can be transmitted to wheels of the motor vehicle by an electric prime mover. It is understood that the electric prime mover can also be connected by a transmission. A tractive force can be maintained in entirety or in part by an electric axle when a gear ratio change is implemented in the transmission for a main drive axle. Moreover, an all-wheel functionality can be at least partially established by an electric axle.

BRIEF DESCRIPTION OF THE DRAWINGS

Example aspects of the invention are described and explained in greater detail in the following with reference to a few selected exemplary embodiments in conjunction with the attached drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
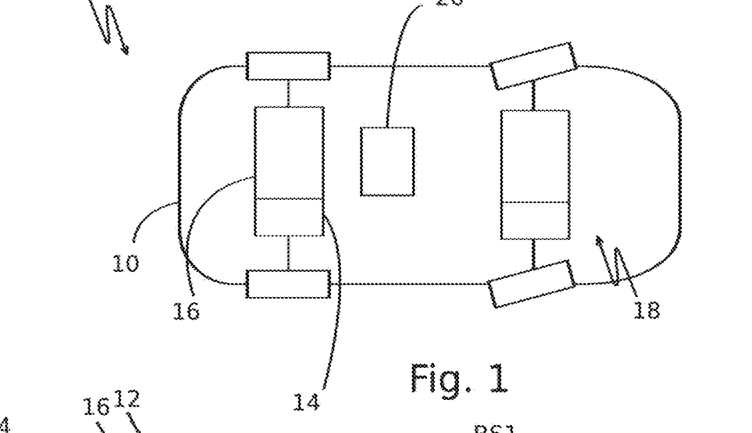
FIG. 1 shows a schematic top view of a motor vehicle that includes a motor vehicle drive train according to example aspects of the invention.

FIG. 1 schematically shows a motor vehicle that includes a motor vehicle drive train 12. The motor vehicle drive train 12 includes an electric prime mover 14 and an electric transmission 16. The electric transmission 16 and the electric prime mover 14 form an electric axle, which is connected to a rear axle of the motor vehicle 10 in the example shown. A further pure combustion or hybrid drive 18 is operatively connected to the front axle of the motor vehicle 10. It is understood that a reversed connection can also be implemented, such that the electric axle is connected to the front axle of the motor vehicle 10 and the rear axle of the motor vehicle 10 includes the further hybrid drive 18. Drive power of the electric prime mover 14 is supplied to the wheels of the motor vehicle 10 by the motor vehicle drive train 12. The motor vehicle 10 also includes an energy accumulator 20 in order to store energy, which is utilized for supplying the electric prime mover 14.

Figure 2:
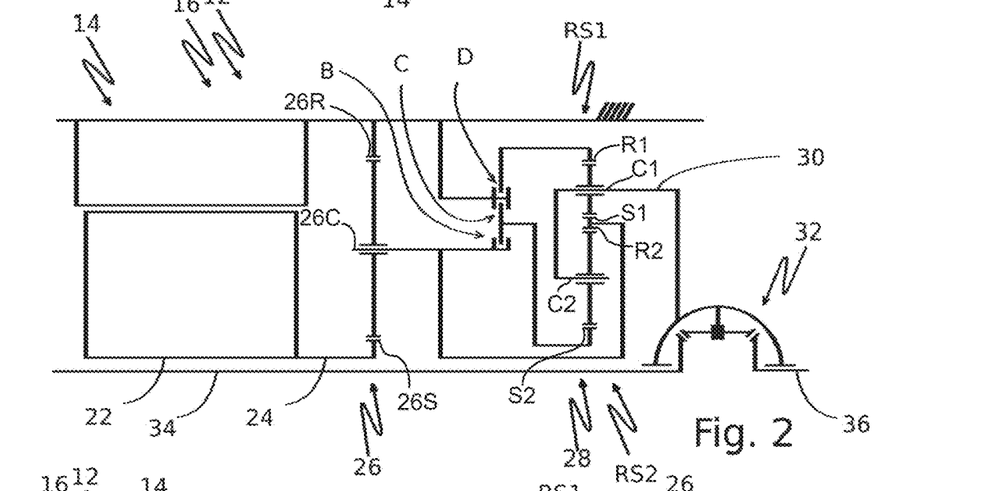
FIG. 2 shows a schematic view of the electric transmission according to example aspects of the invention.

FIG. 2 schematically shows an example variant of an electric transmission 16 in a motor vehicle drive train 12.

The motor vehicle drive train 12 includes the electric transmission 16 and the electric prime mover 14, the rotor 22 of which is connected to a transmission input shaft 24. This transmission input shaft 24 is drivingly connected to a reduction gear 26. In the example shown, the reduction gear 26 includes a planetary gear set, the ring gear 26R of which is rotationally fixed, the sun gear 26S of which is connected to the transmission input shaft 24, and the planet carrier 26C of which is drivingly connected to a transmission 28.

In the example shown, the transmission 28 has a first planetary gear set RS1 and a second planetary gear set RS2, which are radially nested inside each other.

The sun gear S1 of the first planetary gear set RS1 is drivingly connected to a ring gear R2 of the second planetary gear set RS2, wherein the two planetary gear sets RS1, RS2 are arranged in one gear set plane. In other words, the second planetary gear set RS2 is arranged radially within the first planetary gear set RS1.

In the transmission 28, the two planet carriers C1, C2 of the first planetary gear set RS1 and of the second planetary gear set RS2 are drivingly connected by a carrier shaft 30. The carrier shaft 30 can be designed, in particular, as one piece.

The carrier shaft 30 is also connected to a differential 32 designed as a ball differential, which transmits drive power from the electric transmission 16 onto a first output shaft 34 and a second output shaft 36, which are preferably each connected to wheels of the motor vehicle 10.

Moreover, the electric transmission 16 has a first shift element B, a second shift element C, and a third shift element D.

The first shift element B is designed as a clutch, wherein the second shift element C and the third shift element D are each designed as a brake.

The first shift element B is designed for connecting an uncoupled sun gear, i.e., the sun gear S2 of the second planetary gear set RS2, to the transmission input shaft 24. It is understood that a pre-ratio is established by the reduction gear 26 in this connection.

The second shift element C, which is designed as a brake, is designed for rotationally fixing the sun gear S2 of the second planetary gear set RS2, i.e., connecting the sun gear S2 of the second planetary gear set RS2 to a housing-affixed component in a rotationally fixed manner.

The third shift element D, i.e., the second brake, is designed for rotationally fixing an uncoupled ring gear, i.e., in particular, the ring gear R1 of the first planetary gear set RS1.

Due to this advantageous arrangement of the shift elements and the transmission components, two reduction gears and one direct gear having a very high efficiency can be created with the electric transmission 16. The stationary transmission ratios of the two planetary gear sets RS1, RS2 are in a structurally favorable range with a value less than (<) 2.2.

It is understood that the shift elements can be at least partially designed as constant-mesh shift elements. In particular, all shift elements can also be designed as frictional shift elements.

In the example shown in FIG. 2, the reduction gear is connected upstream from the transmission 28 as viewed from the electric prime mover 14. As a result, a high rotational speed of the electric prime mover 14 can be reduced already before entering the transmission 28.

The planetary gear sets RS1, RS2 arranged in the transmission 28 are designed as a nested CC-SR gear set, wherein CC is to be understood to stand for a connection of the two planet carriers ("C" for "carrier") and SR for a connection of a sun gear to a ring gear ("S" for "sun", "R" for "ring").

Figure 3:
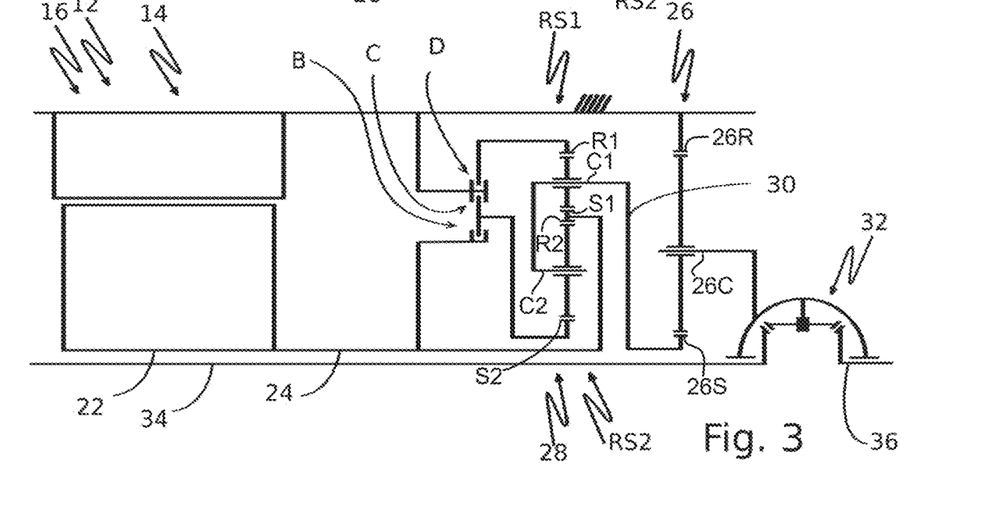
FIG. 3 shows another variant of an electric transmission according to the invention.

Another example variant of an electric transmission 16 according to aspects of the invention is shown in FIG. 3. In contrast to the example embodiment shown in FIG. 2, the transmission input shaft 24 is initially connected to the transmission 28 and then to the reduction gear 26. Otherwise, the connections and the mode of operation are identical to the example embodiment shown in FIG. 2. Due to the downstream reduction gear set, i.e., the reduction gear 26 arranged downstream from the transmission 28 in the power flow, high torques first arise upstream from the differential 32.

Figure 4:
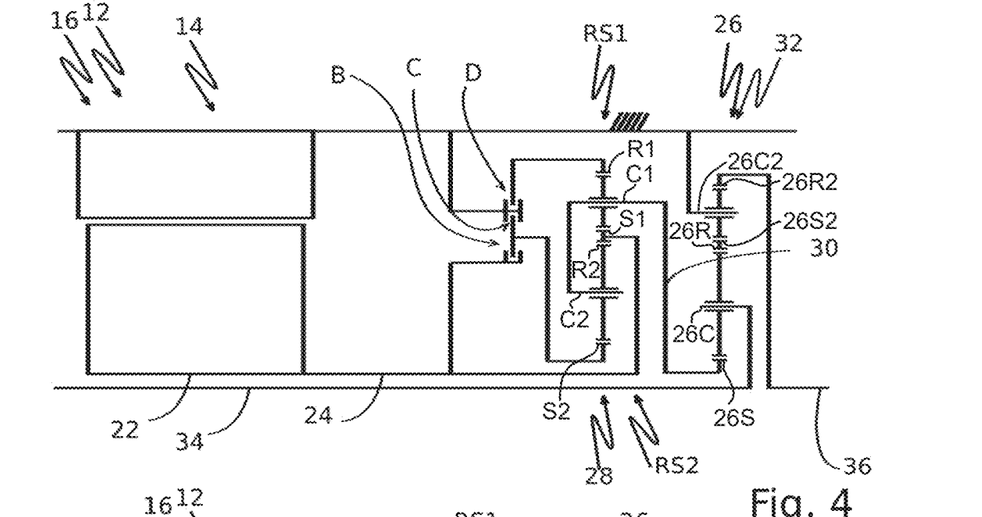
FIG. 4 shows another variant of an electric transmission according to example aspects of the invention.

FIG. 4 shows another example variant of an electric transmission 16 according to aspects of the invention. In contrast to the example embodiment shown in FIG. 3, the differential 32 and the reduction gear 26 are combined to form a two-carrier five-shaft transmission. As a result, the functionality of the differential 32 and a reduction, as with a reduction gear 26, can be achieved. In other words, in the example embodiment shown in FIG. 4, the reduction gear 26 also has a differential. This is achieved by two planetary gear sets (including sun gears 26S, 26S2, carriers 26C, 26C2, and ring gears 26R, 26R2), which are also radially nested.

Figure 5:
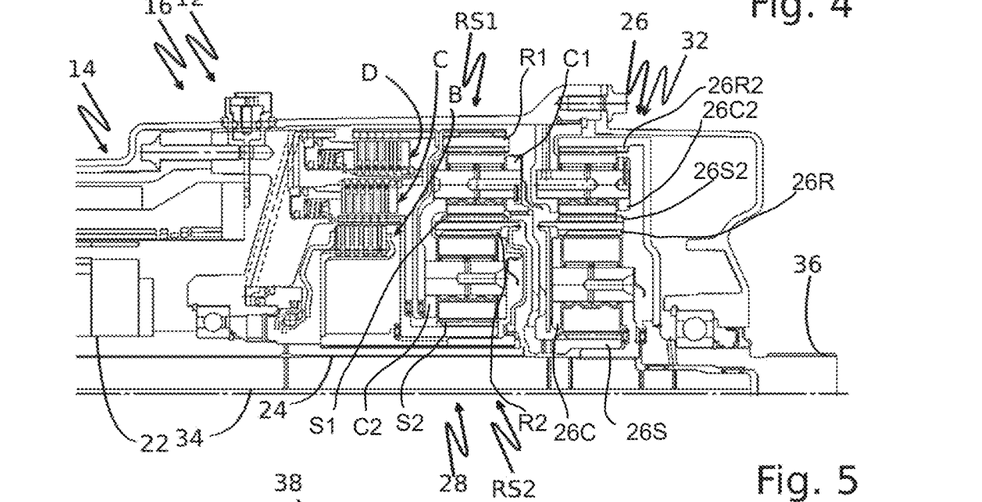
FIG. 5 shows a detailed view of the electric transmission according to example aspects of the invention, according to FIG. 4.

FIG. 5 shows the example electric transmission 16 according to FIG. 4 in greater detail and fully constructed.

The shift elements B, C, D are each designed as a frictional shift element. The individual transmission components are labeled similarly to the schematic view according to FIG. 4.

Figure 6:
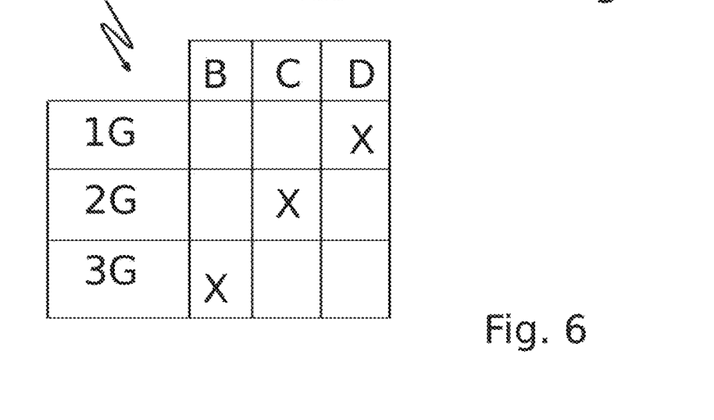
FIG. 6 schematically shows the engagement conditions of the example electric transmission according to FIGS. 2 through 5.

In FIG. 6, the engagement conditions of the individual shift elements for engaging the individual gear steps are schematically shown in a gear shift matrix 38, wherein an "X" indicates that the particular shift element is engaged, i.e., drivingly connects the transmission components associated with the shift element to one another. If an entry is not present in the gear shift matrix 38, it is to be assumed that the particular shift element is disengaged, i.e., does not transmit drive power.

The third shift element D is to be engaged for engaging the first step 1G.

The second gear step 2G can be established by engaging the second shift element C.

An engagement of the first shift element B establishes the third gear step 3G.

It is understood that a two-speed design can also be created, wherein one shift element is omitted. It is also understood that the gear step that is engageable with this shift element is no longer available in the two-speed variant.

Figure 7:
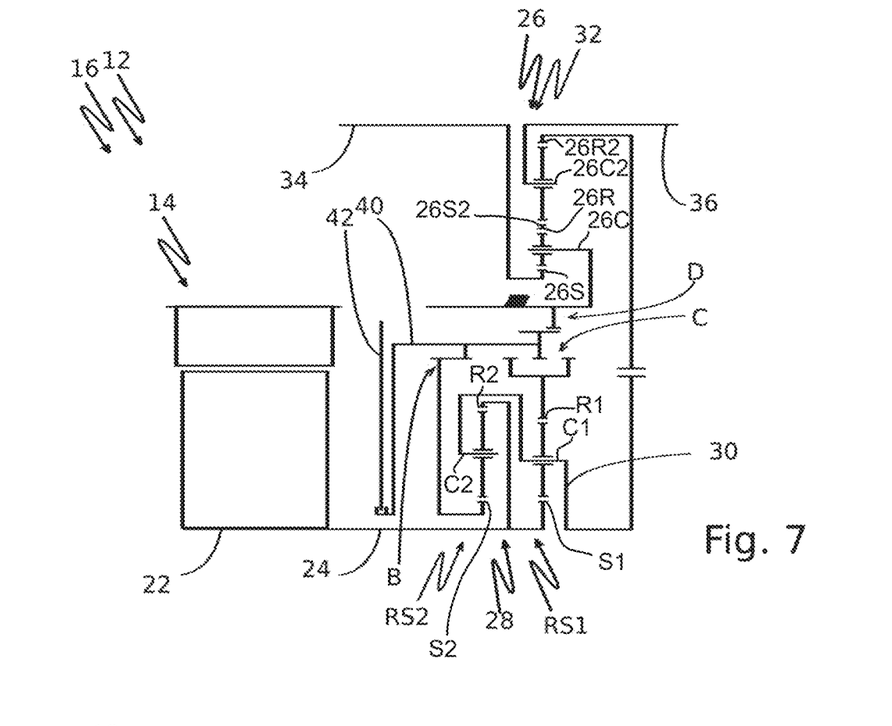
FIG. 7 shows another variant of an electric transmission according to example aspects of the invention.

FIG. 7 shows another example variant of an electric transmission 16 according to aspects of the invention. In contrast to the example embodiment shown in FIG. 2, the CC-SR gear set is no longer radially nested, but rather shown in an example embodiment situated next to one another. Moreover, the electric transmission 16 includes a free shaft 40, which is displaceable in its axial position by a selector fork 42 and, in this way, engages each of the individual shift elements B, C, D. In other words, each engagement condition necessary for engaging three gear steps can be established by displacing the free shaft 40 in the axial direction.

The rotor 22 of the electric prime mover 14 is connected to the transmission input shaft 24, wherein the transmission input shaft 24 is connected to the sun gear S1 of the first planetary gear set RS1 and to the ring gear R2 of the second planetary gear set RS2. The two planetary gear sets RS1, RS2 are drivingly connected to each other at their planet carriers C1, C2 with the carrier shaft 30, wherein the carrier shaft 30 is also drivingly operatively connected to a 2-carrier 5-shaft transmission arranged axially parallel at the first planetary gear set RS1 and the second planetary gear set RS2. As in the example embodiment shown in FIG. 4, this 2-carrier 5-shaft transmission has a reduction function as well as a differential function and distributes drive power onto the first output shaft 34 and the second output shaft 36 of the electric transmission 16.

In the engagement condition shown in FIG. 7, the first shift element B and the third shift element D are engaged. The connections necessary for engaging the gear steps can be established by the shift elements B, C, D arranged at the free shaft 40 by moving the free shaft 40 in the axial direction further away from the electric prime mover 14. The first shift element B is designed for drivingly connecting the sun gear S2 of the second planetary gear set RS2 to the free shaft 40. The second shift element C is designed for drivingly connecting the ring gear R1 of the first planetary gear set RS1 to the free shaft 40. The third shift element D is designed for rotationally fixing the free shaft 40.

Figure 8:
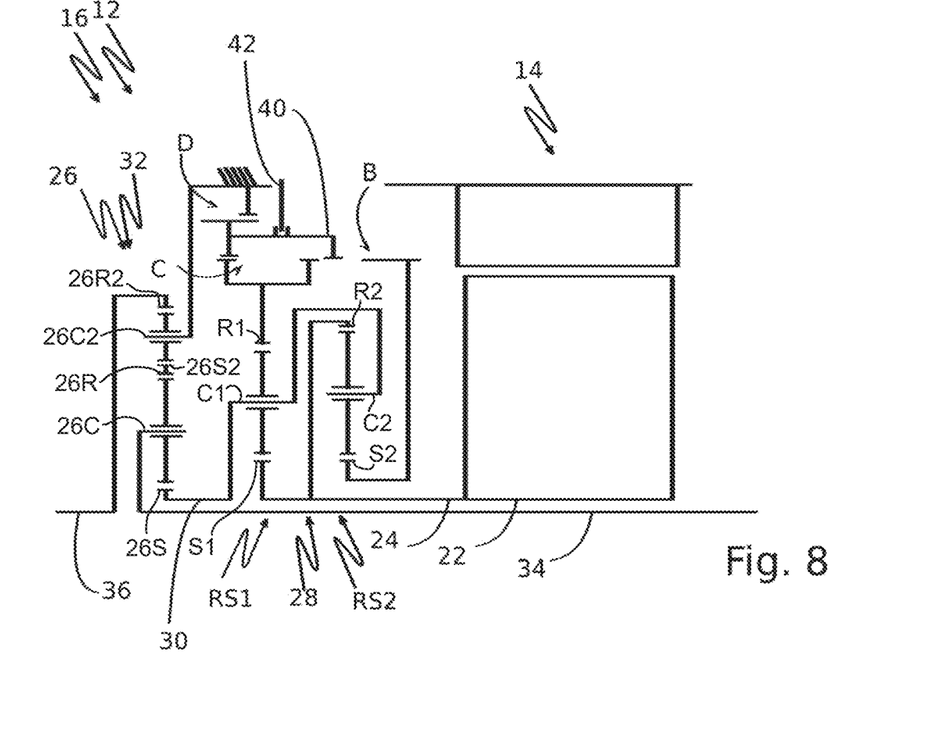
FIG. 8 shows another variant of an electric transmission according to example aspects of the invention.

FIG. 8 shows another example variant of an electric transmission 16 according to aspects of the invention. In contrast to the example embodiment shown in FIG. 7, the 2-carrier 5-shaft transmission is arranged coaxially to the first planetary gear set RS1 and the second planetary gear set RS2, although axially offset with respect to the first planetary gear set RS1 and the second planetary gear set RS2. The 2-carrier 5-shaft transmission is arranged at a side opposite the electric prime mover 14 with respect to the first planetary gear set RS1 and the second planetary gear set RS2. The connections at the free shaft 40 and the remaining connections in the electric transmission 16 are similar to the example embodiment shown in FIG. 7. In the condition shown in FIG. 8, therefore, the second shift element C and the third shift element D are engaged. Accordingly, the free shaft 40 is connected to the ring gear R1 of the first planetary gear set RS1 in a rotationally fixed and driving manner.

Figure 9:
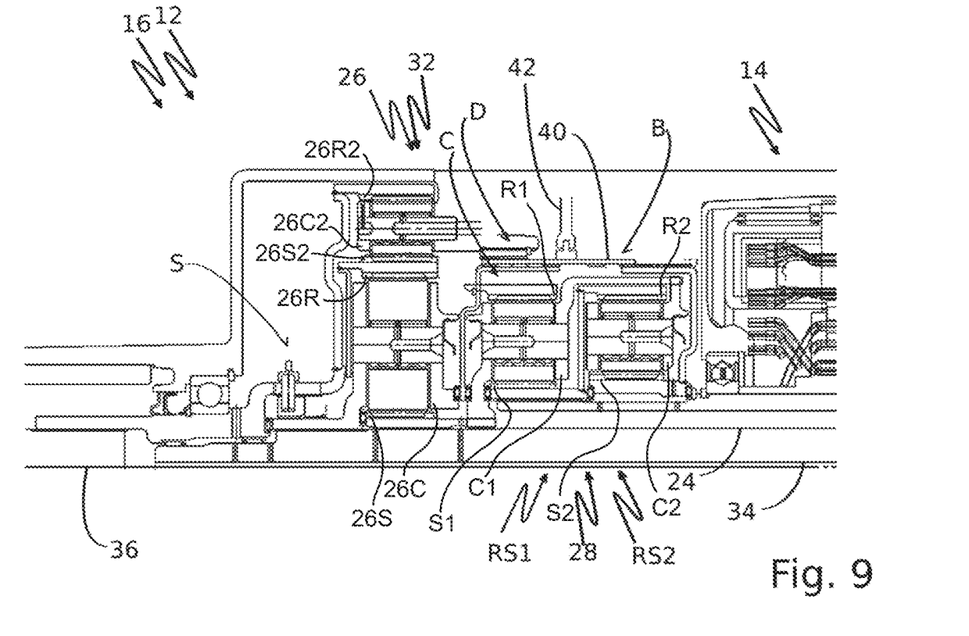
FIG. 9 shows a detailed view of the electric transmission according to example aspects of the invention, according to FIG. 8.

FIG. 9 shows the example electric transmission 16 according to FIG. 8 in greater detail and fully constructed. Identical reference characters refer to identical features and are not explained once more. In contrast to the schematic view of an example embodiment shown in FIG. 8, the example embodiment shown in FIG. 9 includes a differential lock S, which is designed for drivingly connecting the two output shafts 34, 36 to each other. In the example shown, this is achieved due to the fact that axially engaging the differential lock S to the right in the example embodiment shown effectuates a form-locking connection.

Figure 10:
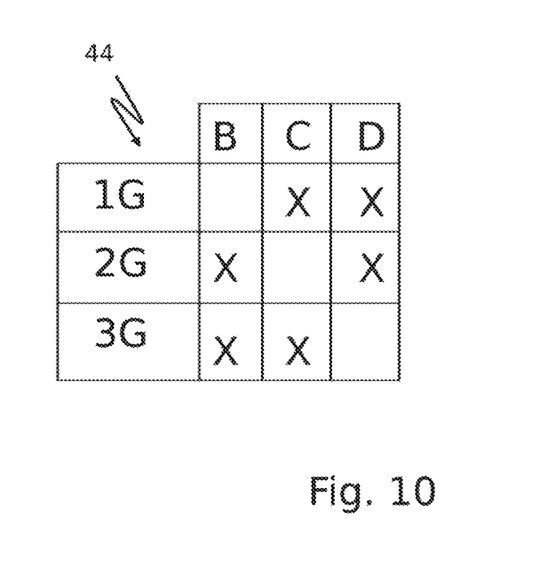
FIG. 10 schematically shows the engagement conditions of the example electric transmission according to FIGS. 7 through 9.

FIG. 10 shows, in a gear shift matrix 44 similar to the gear shift matrix 38 according to FIG. 6, the engagement conditions for engaging the gear steps 1G, 2G, 3G of the electric transmission 16 according to FIGS. 7 through 9.

The second shift element C and the third shift element D are to be engaged for engaging the first gear step 1G.

The second gear step 2G is established by engaging the first shift element B and the third shift element D.

The third gear step 3G is established by engaging the first shift element B and the second shift element C.

The invention has been comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. A single element or a single unit can carry out the functions of several of the units mentioned in the claims. The mere mention of a few measures in multiple various dependent claims is not to be understood to mean that a combination of these measures cannot also be advantageously utilized. Reference characters in the patent claims are not to be understood as limiting. A method for operating a motor vehicle drive train 12 can be implemented, for example, in the form of a computer program that is run on a control unit for the motor vehicle drive train 12. A computer program can be stored/distributed on a non-volatile data carrier, for example, on an optical memory or on a solid state drive (SSD). A computer program can be distributed together with hardware and/or as part of a piece of hardware, for example, by the Internet or by hard-wired or wireless communication systems.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 motor vehicle
12 motor vehicle drive train
14 electric prime mover
16 electric transmission
18 hybrid drive
20 energy accumulator 22 rotor
24 transmission input shaft
26 reduction gear
28 transmission
30 carrier shaft
32 differential
34 first output shaft
36 second output shaft
38 gear shift matrix
40 free shaft
42 selector fork
44 gear shift matrix
B-D shift elements
RS1 first planetary gear set
RS2 second planetary gear set
S differential lock

The invention claimed is:

1. An electric transmission (16) for a motor vehicle drive train (12) of a motor vehicle (10), comprising:
 a transmission input shaft (24) configured for operatively connecting the electric transmission to an electric prime mover (14) of the motor vehicle;
 a reduction gear (26) configured for reducing a rotational speed of the electric prime mover;
 a transmission (28) configured for establishing gear steps, the transmission (28) comprising a first planetary gear set (RS1) and a second planetary gear set (RS2);
 a first output shaft (34) and a second output shaft (36) configured for transmitting drive power from the electric transmission; and
 a plurality of shift elements (B, C, D) configured for engaging the gear steps,
 wherein a planet carrier of the first planetary gear set is drivingly connected to a planet carrier of the second planetary gear set,
 wherein a sun gear of the first planetary gear set is drivingly connected to a ring gear of the second planetary gear set, and
 wherein:
  the shift elements (B, C, D) comprise a first brake (C), a second brake (D), and a clutch (B), an uncoupled sun gear of the transmission (28) connectable to the input shaft by the clutch (B) and rotationally fixable by the first brake (C), an uncoupled ring gear of the transmission (28) rotationally fixable by the second brake (D); or
  the shift elements (B, C, D) comprise a first clutch (C), a brake (D), and a second clutch (B), a free shaft (40) connectable to an uncoupled ring gear of the transmission (28) by the first clutch (C), the free shaft connectable to an uncoupled sun gear of the transmission (28) by the second clutch (B), the free shaft rotationally fixable by the brake (D); or
  the shift elements (B, C, D) comprise a first brake and a second brake, an uncoupled ring gear rotationally fixable by the first brake, an uncoupled sun gear rotationally fixable by the second brake.

2. The electric transmission (16) of claim 1, wherein two reduction gear steps and one direct gear step are establishable with the electric transmission.

3. The electric transmission (16) of claim 1, wherein:
 the first planetary gear set (RS1) and the second planetary gear set (RS) are radially nested; and
 a planet carrier of the first planetary gear set and a planet carrier of the second planetary gear set are formed as one piece.

4. The electric transmission (16) of claim 1, wherein the shift elements (B, C, D) are constant-mesh shift elements.

5. The electric transmission (16) of claim 1, wherein the shift elements (B, C, D) include exactly three shift elements (B, C, D).

6. The electric transmission (16) of claim 1, further comprising:
 a ball or spur gear differential (32) at an output end of the electric transmission (16); or
 an axially parallel or coaxial reduction gear in the form of a 2-carrier 5-shaft transmission with an integrated differential (32).

7. The electric transmission (16) of claim 6, further comprising a differential lock(S).

8. The electric transmission (16) of claim 1, wherein the electric transmission has an overall gear ratio of greater than two.

9. The electric transmission (16) of claim 1, wherein a ratio step between two adjacent gear steps is less than two.

10. A motor vehicle drive train (12) for a motor vehicle (10), comprising:
 the electric transmission (16) of claim 1; and
 the electric prime mover (14) drivingly connected to the transmission input shaft (24).

11. The motor vehicle drive train (12) of claim 10, wherein the electric prime mover is actuatable as a synchronizer during a gear shift in the electric transmission.

12. The motor vehicle drive train (12) of claim 10, wherein:
 the electric transmission (16) is drivingly connectable to a first motor vehicle axle;
 a second motor vehicle axle is connectable to a further hybrid drive (18); and
 the electric prime mover (14) is one or both of
  suppliable with power by the further hybrid drive operated as a generator in order to establish a serial driving mode, and
  actuatable as a supporting force mechanism in order to maintain a supporting force during gear shifts in the further hybrid drive.

13. A method for operating the motor vehicle drive train (12) of claim 10, the method comprising one or more of:
 actuating the electric prime mover as a synchronizer during a gear shift in the electric transmission;
 supplying the electric prime mover (14) with power by a further hybrid drive operated as a generator in order to establish a serial driving mode; and
 actuating the electric prime mover (14) as a supporting force mechanism in order to maintain a supporting force during gear shifts in the further hybrid drive.

14. A motor vehicle, comprising:
 the motor vehicle drive train (12) of claim 10; and
 an energy accumulator (20) configured for storing energy for supplying the electric prime mover (14).

15. A motor vehicle drive train (12) for a motor vehicle (10), comprising:
 an electric prime mover (14);
 an electric transmission (16), comprising:
  a transmission input shaft (24) drivingly connected to the electric prime mover (14) for operatively connecting the electric transmission (16) to the electric prime mover (14);
  a reduction gear (26) configured for reducing a rotational speed of the electric prime mover;

a transmission (28) configured for establishing gear steps, the transmission (28) comprising a first planetary gear set (RS1) and a second planetary gear set (RS2);

a first output shaft (34) and a second output shaft (36) configured for transmitting drive power from the electric transmission; and a plurality of shift elements (B, C, D) configured for engaging the gear steps, wherein a planet carrier of the first planetary gear set is drivingly connected to a planet carrier of the second planetary gear set, and wherein a sun gear of the first planetary gear set is drivingly connected to a ring gear of the second planetary gear set;

a further hybrid drive (18);

a first motor vehicle axle drivingly connectable to the electric transmission (16); and a second motor vehicle axle connectable to the further hybrid drive (18), wherein the electric prime mover (14) is one or both of:
suppliable with power by the further hybrid drive operated as a generator in order to establish a serial driving mode, and
actuatable as a supporting force mechanism in order to maintain a supporting force during gear shifts in the further hybrid drive.

* * * * *